United States Patent [19]

Arnold et al.

[11] 4,248,778

[45] Feb. 3, 1981

[54] ABS-POLYMERS OF HIGH NOTCHED IMPACT STRENGTH

[75] Inventors: Bernhard Arnold, Pulheim; Friedrich Kowitz, Dormagen; Dieter Kuhlmann, Pulheim; Karl-Heinz Ott, Leverkusen; Leo Morbitzer, Cologne, all of Fed. Rep. of Germany

[73] Assignee: Bayer Aktiengesellschaft, Fed. Rep. of Germany

[21] Appl. No.: 50,071

[22] Filed: Jun. 19, 1979

[30] Foreign Application Priority Data

Jun. 23, 1978 [DE] Fed. Rep. of Germany ....... 2827594

[51] Int. Cl.³ .............................. C08J 3/18; C08L 9/02
[52] U.S. Cl. ...................... 260/23.7 M; 260/29.1 SB
[58] Field of Search ................. 260/23.7 M, 29.1 SB

[56] References Cited

U.S. PATENT DOCUMENTS

| | | |
|---|---|---|
| 3,607,819 | 9/1971 | Beckman et al. ............. 260/23.7 M |
| 3,637,555 | 1/1972 | Marinacci et al. ............ 260/23.7 M |
| 3,712,872 | 1/1973 | Lammers et al. ............. 260/23.7 M |
| 3,728,294 | 4/1973 | Levine ......................... 260/29.1 SB |
| 3,883,460 | 5/1975 | Lohr et al. .................... 260/23.7 M |
| 3,959,203 | 5/1976 | Keil ............................... 260/29.1 SB |
| 4,103,071 | 7/1978 | Abe et al. ..................... 260/29.1 SB |

FOREIGN PATENT DOCUMENTS

| | | |
|---|---|---|
| 49-344 | 1/1974 | Japan ............................. 260/29.1 SB |
| 974146 | 11/1964 | United Kingdom ............. 260/23.7 M |
| 436828 | 1/1975 | U.S.S.R. ......................... 260/29.1 SB |

*Primary Examiner*—Ronald W. Griffin
*Attorney, Agent, or Firm*—Connolly and Hutz

[57] ABSTRACT

The use of a liquid polymethyl phenyl siloxane or a liquid polydimethyl siloxane, in combination with calcium stearate, pentaerythritol tetrastearate, bis-stearylamide of ethylene diamine or mixtures thereof for improving the physical properties of ABS-polymers.

4 Claims, No Drawings

ABS-POLYMERS OF HIGH NOTCHED IMPACT STRENGTH

In the context of the present invention, by the term ABS polymers is meant mixtures of graft products and thermoplastic resins. The graft products or graft rubbers are polymers of ethylenically unsaturated monomers which have been polymerised in the presence of a rubber. Thermoplastic resins are produced from corresponding monomers. They form the continuous phase (matrix) in the mixture and are also referred to hereinafter as SAN-resins.

In addition to the actual polymerisation process, the production of ABS-polymers involves a compounding step in which the graft rubber and the thermoplastic resin are intensively mixed together and, at the same time, additives required for subsequent further processing or for practical application are worked in. Additives such as these include, for example, lubricants, pigments and antistatic agents.

The mixing units generally used are internal kneaders or double-screw to four-screw extruders to which is connected a two-roll stand with a band granulator or a strand or underwater granulator. The choice of the compounding unit is determined by the process used to produce the ABS. If, for example, the SAN-resin is obtained as a solution polymer, it is mixed with the separately produced graft rubber in a screw kneader. In cases where emulsion polymerisation is used, the powder initially obtained is often further treated in an internal kneader.

Generally, about 1 to 3% by weight of a lubricant is added as a processing aid to improve the flow properties of the ABS-polymers and to reduce internal stresses in the shaped articles produced therefrom. Suitable lubricants are, for example, alkali and alkaline-earth salts of fatty acids, fatty acid esters of monohydric or polyhydric alcohols and amides of long-chain fatty acids and sulphonic acids.

The present invention is based on the discovery that the addition of very small quantities of silicone oils to ABS-polymers considerably improves their impact strength and notched impact strength, particularly at low temperatures, without having any effect upon their free-flow properties. The present invention relates to the use of from 0.05 to 0.5% by weight of a liquid polymethyl phenyl siloxane or a liquid polydimethyl siloxane having a viscosity of from 20 to 100,000 cSt. at 20° C. together with from 0.25 to 5 parts by weight, based on 100 parts by weight of ABS-polymers, calcium stearate, pentaerythritol tetrastearate, the bis-stearylamide of ethylene diamine or mixtures thereof, for improving notched impact strength or other properties of the ABS-polymers. In the case of polymethyl phenyl siloxanes, a preferred quantitative range is from 0.05 to 0.25% by weight, based on the ABS-polymer. The polymethyl phenyl siloxanes preferably have a viscosity of from 30 to 1000 cSt. at 20° C. and the polydimethyl siloxanes a viscosity of from 50 to 50,000 cSt.

In the context of the invention, ABS-graft polymers are in particular mixtures of (a) from 50 to 70% by weight of one or more graft products and (b) from 95 to 30% by weight of one or more thermoplastic resins.

Preferred graft products (a) are polymers obtained by polymerising graft monomers in the presence of a rubber as graft base. The rubber content is preferably from 5 to 80% by weight and is determined by the particular polymerisation process used.

Suitable graft bases are, in particular, polybutadiene, natural rubber, butadiene/acrylonitrile copolymers and butadiene/styrene copolymers and block polymers. It is also possible to use acrylic ester/vinyl ether polymers and also EPDM-terpolymers. Graft monomers are, in the main, styrene, mixtures of styrene and acrylonitrile, preferably in a weight ratio of from 90:10 to 50:50, mixtures of styrene and methyl (meth)acrylate, preferably in a weight ratio of from 5:95 to 95:5, and mixtures of styrene, acrylonitrile and methyl(meth)acrylate.

The production of graft products such as these is known per se. The graft monomers may be polymerised in emulsion in the presence of a rubber latex and the graft reaction is then initiated with a radical initiator. If the rubber is incipiently crosslinked and if certain quantitative ratios between the graft monomers and the graft bases are maintained during the graft reaction, the size of the rubber particles in the latex will determine the particle size of the resulting graft polymer. The graft coating of chains of the polymer of the graft monomers chemically attached to the rubber particles is relatively thin and does not significantly alter the size of the rubber particle. In this respect, the critical value is known as the $d_{50}$-value, i.e. the value of the diameter above which and also below which 50% of the particle diameters lie. The graft reaction is incomplete so that its product is referred to as the graft product. In addition to the actual graft polymer, it also contains ungrafted copolymer of the graft monomers.

The graft polymers may also be produced by bulk/solution or bulk/suspension polymerisation, preferably from monomer-soluble rubber. The size of the graft rubber particles is then established in the phase inversion stage and may be influenced mechanically (by stirring) and by chemically influencing the phase equilibrium (addition of dispersants). In general, particles having a diameter of $1\mu$ or larger are obtained in bulk-/solution graft processes. The rubber content of the graft product is limited to a maximum of 25% by weight.

According to the present invention, it is possible to use products of which the particles have a diameter of from 0.05 to $20\mu$ and products in which a considerable proportion of the graft monomers is included as homopolymer or copolymer within the rubber particles. Preferred particle sizes are from 0.05 to $1.2\mu$ and, more particularly, from 0.05 to $0.6\mu$. It is also possible to use several different graft products alongside one another, for example two graft products which differ in their degree of grafting (or in their graft density), in their particle size or in both their degree of grafting and their particle size. For example, a mixture of a graft product with particles having a $d_{50}$-value of from 0.35 to $10\mu$ and a graft product with particles having a $d_{50}$-value of from 0.05 to $0.32\mu$ is particularly suitable (ABS-polymers produced in this way are also known as bimodal systems).

The graft products preferably contain from 35 to 80% by weight and, more particularly, from 40 to 70% by weight of rubber and have $d_{50}$ particle sizes of from 0.1 to $0.5\mu$. They are used in such a quantity that the final ABS-polymer contains from 5 to 25% by weight and preferably from 5 to 20% by weight of rubber.

The thermoplastic resin (b) forming the second constituent of the ABS-polymer represents the continuous matrix and is a polymer or copolymer of styrene, α-methyl styrene/acrylonitrile/methyl(meth)acrylate or maleic acid anhydride. It is particularly preferred to use polystyrene, styrene/acrylonitrile copolymers having an acrylonitrile content of from 20 to 35% by weight and α-methyl styrene/acrylonitrile copolymers containing from 20 to 31% by weight of acrylonitrile. The weight average of the molecular weight of these particular resins amounts to between 50,000 and 550,000 and their molecular inconsistency $$U_n \left( \frac{M_w}{M_n} - 1 = U_n \right)$$

to between 1.0 and 3.5.

Where a single graft product is used, it is advantageous for the quantitative compositions of the graft monomers and of the resin to be similar or the same. Where a mixture of 2 graft products with different particle sizes is used, it is advantageous for the quantitative composition of the graft monomers of the graft product having the larger particle size to be different from the composition of the resin. α-Methyl styrene in combination with acrylonitrile cannot be grafted and should only be used in the resin.

The thermoplastic resins, for example styrene/acrylonitrile or α-methyl styrene/acrylonitrile copolymers may be produced by known processes, for example by bulk polymerisation, solution polymerisation, suspension polymerisation or emulsion polymerisation.

The graft product and the thermoplastic resin are often produced separately, in most cases by emulsion polymerisation. If the components accumulate in latex form, the latices may be mixed and precipitated together. The silicone oils used in the present invention as additives for improving notched impact strength may be combined with standard lubricants. In general, from 0.25 to 5 parts by weight of lubricant are used to 100 parts by weight of the ABS-polymer. Preferred combinations are the following (based in each case on 100 parts by weight of the ABS-polymer):

(1)

0.05 to 0.25 part by weight of polydimethyl siloxane; and
0.25 to 3.0 parts by weight of pentaerythritol tetrastearate;

(2)

0.05 to 0.25 part by weight of polydimethyl siloxane,
0.25 to 2.0 parts by weight of pentaerythritol tetrastearate; and
0.5 to 1.5 parts by weight of the bis-stearylamide of ethylene diamine;

(3)

0.05 to 0.25 part by weight of polydimethyl siloxane; and
0.25 to 3.0 parts by weight of the bis-stearylamide of ethylene diamine;

(4)

0.05 to 0.5 part by weight of polymethylphenyl siloxane,
0.25 to 2.0 parts by weight of pentaerythritol tetrastearate; and 0.5 to 1.5 parts by weight of the bis-stearylamide of ethylene diamine.

Combination (1) gives optimal toughness together with optimal hardness and thermal stability under load. Combination number (3) gives high toughness together with very good flow properties, and finally, combinations numbers (2) and (4) give optimal compromises of the above features. The silicone oils may, of course, also be combined with other known lubricants.

Particularly preferred ABS-polymers are as follows:

(I) Mixtures of 5 to 50 parts by weight of a graft product of:
    40 to 80 parts by weight of polybutadiene and
    60 to 20 parts by weight of a styrene/acrylonitrile copolymer in a respective weight ratio of from 75:25 to 70:30 the copolymer having a $d_{50}$ particle size of from 0.1 to 0.6μ and preferably of from 0.25 to 0.5μ, and
95 to 50 parts by weight of a styrene/acrylonitrile copolymer (respective weight ratio 75:25 to 70:30) or 95 to 50 parts by weight of an α-methyl styrene/acrylonitrile copolymer (ratio 70:30), the ABS-polymer optionally containing up to 20% by weight of polybutadiene; and (II) a mixture of 90 to 10 parts by weight of a graft product mixture and
10 to 90 parts by weight of a copolymer of styrene and/or α-methyl styrene and acrylonitrile in a weight ratio, respectively, of from 80:20 to 60:40 said copolymer having an average molecular weight of from 50,000 to 300,000 and in which the graft product mixture consists of (i) from 90 to 20 parts by weight of a graft product of from 20 to 60 parts by weight of styrene and acrylonitrile in a respective weight ratio of from 88:12 to 60:40 on from 80 to 40 parts by weight of butadiene homopolymer or copolymer having a butadiene content of at least 70% by weight and an average $d_{50}$ particle diameter of from 0.26 to 0.65μ and (ii) 10 to 80 parts by weight of a graft product of from 60 to 40 parts by weight of a mixture of styrene and acrylonitrile in a respective weight ratio of from 80:20 to 60:40 on from 40 to 60 parts by weight of a butadiene homopolymer or copolymer having a butadiene content of at least 70% and an average $d_{50}$ particle diameter of from 0.08 to 0.25μ.

The polysiloxanes used in the present invention may advantageously be added to the ABS-polymer during compounding by directly introducing the silicone oil into the kneading unit in which mixing is carried out. Where bulk or bulk/suspension polymerisation is used, the silicone oil may be added during the actual polymerisation reaction. The effect of the silicone oil additive lies in increasing notched impact strength without adversely affecting the other physical properties of the ABS-polymer.

EXAMPLES

A. Production and characteristics of the ABS-polymers

Process 1: The latex of the graft rubber is mixed with one or more SAN-copolymer latices in a certain quantitative ratio. Following the addition of an aqueous stabiliser dispersion (containing from 0.25 to 1.5 parts by weight of a phenolic antioxidant per 100 parts by weight of polymer), the latex mixture is coagulated by the addition of an electrolyte or an acid. The resulting powder is dried in a vacuum drying cabinet at a temperature of from 70° to 80° C.

Process 2: Following addition of the stabiliser, the latex of the graft rubber (or graft rubber mixture) is coagulated and processed into a powder. SAN-copolymer is optionally mixed in according to (B) hereinafter. The ABS-graft rubbers and SAN-copolymers used are characterised in more detail in Tables 1 and 2.

TABLE 1
Graft rubbers used in the Examples

| Graft polymer | Ratio by weight of graft base to graft cover. | Ratio by weight of styrene to ACN in the monomer mixture. |
|---|---|---|
| P 1 | 50:50 | 70:30 |
| P 2 | 60:40 | 88:12 |
| P 3 | 50:50 | 70:30 |
| P 4 | 50:50 | 70:30 |
| P 5 | 80:20 | 70:30 |

| Average particle diameter in $\mu$ ($d_{50}$) (1) | G-value (2) | Composition of the graft base (3) | |
|---|---|---|---|
| | | B % | S % |
| ~0.4 | 0.55 | 100 | |
| ~0.4 | 0.45 | 100 | |
| ~0.1 | 0.72 | 100 | |
| ~1.2 | 0.45 | 90 | 10 |
| 0.1 | /.16 | 100 | |

(1) Ultracentrifuge measurements. cf. W. Scholtan, H. Lange, Kolloidz. und Z. Polymere 250 (1972) 783–796, and G. Kampf, H. Schuster. Angew. Makromol. Chemie 14 (1970) 111–129. The particle diameter is the $d_{50}$-value.
(2) The degree of grafting G (G-value designates the ratio $\frac{\text{"SAN" grafted}}{\text{graft base}}$ as a dimensionless value.
(3) B = butadiene, S = styrene.

TABLE 2
SAN and methyl styrene/acrylonitrile copolymers used in the Examples.

| Copolymer | Copolymer composition (% by weight) | | |
|---|---|---|---|
| | Styrene | ACN | α-methyl styrene |
| S 1 | 74 | 26 | |
| S 2 | 70 | 30 | |
| S 3 | 68 | 32 | |
| S 4 | | 30 | 70 |
| S 5 | 70 | 30 | |

| Viscosity[1] $\eta \frac{\text{spec.}}{C}$ | $U_n$-value[2] |
|---|---|
| 95 | 3.0 |
| 70 | 2.0 |
| 65 | 2.1 |
| 65 | 2.2 |
| 110 | 2.5 |

[1] Viscosity = $\eta \frac{\text{spec.}}{C}$ with C = 5 g/l MEK, 25° C.
[2] $U_n$-value = $\frac{M_w}{M_n} - 1$   $M_w$ = weight average of the molecular weight   $M_n$ = numerical average of the molecular weight

B. Production of the ABS-polymers

Known compounding units which guarantee homogeneous mixing at temperatures of from 140° to 260° C. may be used for producing the ABS-polymers. Suitable compounding units are inter alia heated mixing rolls followed by a granulator, double-screw and four-screw kneaders followed by a granulator, and also internal mixers and Banbury mixers followed by a two-roll stand and granulator.

Where compounding is carried out in a BR Banbury mixer (Pomini-Farrel), the following mixing conditions apply to ABS-polymers:

| melt temperature | 190 to 225° C. |
|---|---|
| mixing times | 1.5 to 2 minutes |
| cycle times | 2.0 to 4 minutes |

After mixing, the material passes in the form of a plastic mass to a two-roll stand (roll 1 T = 160° C., roll 2 T = 150° C.) and is run off in the form of a band which is then granulated after cooling.

General recipe for filling the internal kneader:

| ABS-polymer | 100.00 | parts by weight |
|---|---|---|
| lubricant 1 | x | parts by weight |
| lubricant 2 | y | parts by weight |
| polydimethyl siloxane | z | parts by weight |
| pigments | n | parts by weight |

C. Test procedure

Standard small test bars are produced from the granulate by injection moulding at a melt temperature of 220° C. Notched impact strength, impact strength, hardness and thermal stability under load according to Vicat B are determined by DIN methods. Processibility is determined by the flat spiral test according to H. Ebneth, K. Bohm: Fließfahigkeit von ABS-Polymerisation (Fluidity of ABS-Polymers), Plastverarbeiter 19 (1968) 4, pages 261–269. Test temperature: 220° C.

EXAMPLES 1 TO 5

Comparison Examples a, a₁, b.

An ABS-polymer of the following composition is produced by latex mixing and processing into powder form:

| graft polymer P 1 | 25.0 parts by weight |
|---|---|
| SAN-copolymer S 5 | 75.0 parts by weight. |

The following ingredients are added in the internal kneader (parts by weight per 100 parts by weight of ABS-powder) under the reaction conditions described in (B) hereinabove:

| | Polydimethyl siloxane | | |
|---|---|---|---|
| Example | parts by weight | Viscosity 20° C. cSt. | Ca-stearate parts by weight |
| a | — | — | — |
| a₁ | 0.25 | — | — |
| b | — | — | 0.5 |
| 1 | 0.2 | 10 | 0.5 |
| 2 | 0.2 | 50 | 0.5 |
| 3 | 0.2 | 1 440 | 0.5 |
| 4 | 0.2 | 10 000 | 0.5 |
| 5 | 0.3 | 300 000 | 0.5. |

After the granulate has been further processed into standard small test bars and tested in accordance with (C) above, the results set out in Table 3 are obtained:

TABLE 3

| Example/Comparison Example | a | a₁ | b | 4 | 5 | 6 | 7 | 8 |
|---|---|---|---|---|---|---|---|---|
| Notched impact strength(23° C. kJ/m²) | 5.3 | 16.3 | 7.2 | 20.7 | 20.5 | 20.0 | 19.2 | 18.5 |
| Ball indentation hardness (30 s N/mm²) | 88.1 | 87.2 | 93 | 110 | 111 | 112 | 112 | 111 |

As can be seen from Table 3, the results obtained with the polymers produced in accordance with the present invention are largely unaffected by the viscosity (molecular weight) of the polydimethyl siloxane.

EXAMPLES 6 TO 8

Comparison Examples c,d,e,f

An ABS-polymer of the following composition is produced by latex mixing:

| | |
|---|---|
| graft polymer P 2 | 12.6 parts by weight |
| graft polymer P 3 | 20.0 parts by weight |
| SAN-copolymer S 1 | 67.4 parts by weight |

The following ingredients (based on 100 parts by weight of the ABS-polymer) are added during the compounding stage according to (B) above:

| Example | Polydimethyl siloxane 100 cSt (20° C.) parts by weight. | Bis-stearyl-amide of ethylene diamine parts by weight. | Pentraery-thritol tetrastearate parts by weight. |
|---|---|---|---|
| 6 | 0.2 | 3.0 | 1.0 |
| 7 | 0.2 | 2.0 | 2.0 |
| 8 | 0.2 | 1.0 | 2.0 |
| c | — | 3.0 | — |
| d | — | 2.0 | 1.0 |
| e | — | 1.0 | 2.0 |
| f | — | — | 3.0 |

The results obtained with these forms after further processing in accordance with (C) above are set out in Table 4:

TABLE 4

| Examples/comparison Examples | 6 | 7 | 8 | c | d | e | f |
|---|---|---|---|---|---|---|---|
| Notched impact strength 23° C. kJ/m² | 12 | 14 | 15 | 9 | 10 | 12 | 7.5 |
| Ball indentation hardness 30 sec. N/mm² | 93 | 90 | 92 | 94 | 93 | 93 | 94 |
| Flow length cm flat spiral 220° C. | 45 | 45 | 44 | 45 | 45 | 42 | 41 |

As can be seen from Table 4, optimal data are obtained where a lubricant system consisting of polydimethyl siloxane, pentaerythritol tetrastearate and the bis-stearylamide of ethylene diamine is used.

EXAMPLES 9 TO 12

The following ingredients are mixed in an internal kneader under the reaction conditions described in (B) above:

| | Graft polymer | | SAN-copolymer | | Ca-stearate |
|---|---|---|---|---|---|
| Example | Type | Parts by weight | Type | Parts by weight | parts by weight |
| 9 | P 1 | 10 | S 1 | 90 | 0.5 |
| 10 | P 1 | 20 | S 1 | 80 | 0.5 |
| 11 | P 1 | 30 | S 1 | 70 | 0.5 |
| 12 | P 1 | 40 | S 1 | 60 | 0.5 |

| Polydimethyl siloxane 20 cSt (20° C.) parts by weight. |
|---|
| 0.2 |
| 0.2 |
| 0.2 |
| 0.2 |

The test specimens produced in accordance with (C) above show the following mechanical properties (Table 5):

TABLE 5

| Examples | 9 | 10 | 11 | 12 |
|---|---|---|---|---|
| Notched impact strength kJ/m² 23° C. | 6.0 | 15.5 | 19.0 | 20.0 |
| Ball indentation hardness 30 sec. N/mm² | 136 | 114 | 96 | 80 |
| Vicat softening temperature B (4.9 N)° C. | 99 | 98 | 97 | 96 |
| Flow length 220° C. cm flat spiral | 40 | 36 | 35 | 33 |

Table 5 illustrates the surprising advance made by using the polymethyl siloxanes. Even with a total rubber content of 10% by weight, notched impact strength values of 15 kJ/m² are obtained.

EXAMPLES 13, 14 AND 15

The following ingredients are mixed in an internal kneader under the reaction conditions described in (B) above:

| | Graft polymer | | SAN-copolymer | | Poly-dimethyl siloxane |
|---|---|---|---|---|---|
| Example | Type | parts by weight | Type | parts by weight | |
| 13 | P 2 | 12.6 | S 3 | 67.4 | 0.2 |
| | P 3 | 20.0 | | | |
| 14 | P 2 | 12.6 | S 3 | 67.4 | 0.2 |
| | P 3 | 20.0 | | | |
| 15 | P 2 | 11.0 | S 4 | 52.0 | 0.2 |
| | P 3 | 17.0 | S 1 | 20.0 | |

| | Wax⁽¹⁾ | PETS⁽²⁾ |
|---|---|---|
| | 3.0 | — |
| | 2.0 | 1.0 |
| | 2.0 | 1.0 |

⁽¹⁾Wax = bis-stearylamide of ethylene diamine
⁽²⁾PETS = pentaerythritol tetrastearate.

After further processing in accordance with (C) above, the following properties were determined on these products (Table 6):

TABLE 6

| Example No. | 13 | 14 | 15 |
|---|---|---|---|
| Notched impact strength | 13 | 14 | 14 |

TABLE 6-continued

| Example No. | 13 | 14 | 15 |
|---|---|---|---|
| kJ/m² 23° C. | | | |
| Ball indentation hardness 30 sec N/mm² | 80 | 80 | 94 |
| Vicat softening temperature B | | | 102 |
| Flow length cm flat spiral 220° C. | 55 | 52 | 38 |

As can be seen from Table 6, the use of polydimethyl polysiloxane leads to excellent product properties.

EXAMPLES 16 AND 17

ABS-polymers of the following compositions are produced by latex mixing:

| | Graft polymer | | SAN-copolymer | |
|---|---|---|---|---|
| Example | Type | Parts by weight | Type | Parts by weight |
| 16 | P 5 | 22 | S 2 | 78 |
| 17 | P 4 | 35 | S 1 | 65 |

The following ingredients are added to the powder (per 100 parts by weight of powder) during further processing in an internal kneader under the conditions described in (B) above:

| | Polydimethyl siloxane 20° C. 60 cSt | Ca-stearate |
|---|---|---|
| Example | parts by weight | parts by weight |
| 16 | 0.15 | 0.5 |
| 17 | 0.15 | 0.5 |

After further processing of the granulate, the test data set out in Table 7 were obtained:

TABLE 7

| Example No. | 16 | 17 |
|---|---|---|
| Notched impact strength kJ/m² 23° C. | 16 | 17 |
| Ball indentation hardness 30 sec N/mm² | 83 | 80 |
| Flow length cm flat spiral 220° C. | 39 | 42 |

EXAMPLE 18

Comparison Example g

An ABS-polyblend of the following composition is produced by latex mixing, followed by working up into powder form:

graft polymer P 1     60 parts by weight
SAN-copolymer S 5    40 parts by weight.

The following ingredients are added to the polyblend powder (per 100 parts by weight) during further processing in an internal kneader under the conditions described in (B) above:

| | Polydimethyl siloxane | | | Polypropylene glycol |
|---|---|---|---|---|
| Example | Parts by weight | Viscosity 20° C. cSt | Ca-stearate | MW~2000 |
| 18 | 0.2 | 1440 | 0.5 | 0.5 |
| g | — | — | 0.5 | 0.5 |

After the granulate has been further processed into standard small test bars and tested in accordance with (C) above, the data set out in Table 8 are measured.

TABLE 8

| Example No. | 18 | g |
|---|---|---|
| Notched impact strength kJ/m² | | |
| 23° C. | 19 | 18 |
| −40° C. | 16 | 10 |
| Ball indentation hardness 30 sec N/mm² | 65 | 64.8 |
| Flow length cm flat spiral 220° C. | 30 | 30 |

We claim:
1. A composition of matter comprising 100 parts by weight of an acrylonitrile-butadiene-styrene polymer, 0.05 to 0.5 parts by weight of a liquid polymethyl phenyl siloxane or liquid polydimethyl siloxane having a viscosity from 20 to 100,000 cSt at 20° C. and 0.25 to 5 parts by weight of calcium stearate, pentaerythrol tetrastearate, the bis-stearylamide of ethylene diamine or a mixture thereof.

2. A composition as claimed in claim 1 wherein said polymer is a mixture of (a) from 5 to 70% by weight of one or more graft products, and (b) from 95 to 30% by weight of one or more thermoplastic resins.

3. A composition as claimed in claim 1 wherein said polymer is a mixture of 5 to 50 parts by weight of a graft product of 40 to 80 parts by weight of polybutadiene and 60 to 20 parts by weight of a styrene/acrylonitrile copolymer in a respective weight ratio of from 75:25 to 70:30, the copolymer having a d$_{50}$ particle size of from 0.1 to 0.6 micron and 95 to 50 parts by weight of a styrene/acrylonitrile copolymer in a respective weight ratio 75:25 to 70:30, or 95 to 50 parts by weight of an α-methylstyrene/acrylonitrile copolymer in a respective weight ratio of 70:30.

4. A composition as claimed in claim 3 wherein said polymer contains up to 20% by weight of polybutadiene.

* * * * *